US012648508B2

(12) United States Patent  
Brink et al.

(10) Patent No.: US 12,648,508 B2  
(45) Date of Patent: Jun. 9, 2026

(54) MANURE ARRANGEMENT AND A METHOD FOR CONTROLLING OPERATION OF A MANURE ARRANGEMENT

(71) Applicant: DELAVAL HOLDING AB, Tumba (SE)

(72) Inventors: Marek Brink, Tumba (SE); Piotr Hofman, Tumba (SE); Bartlomiej Jaklik, Tumba (SE); Bartlomiej Slusarczyk, Tumba (SE)

(73) Assignee: DeLaval Holding AB, Tumba (SE)

( * ) Notice: Subject to any disclaimer, the term of this patent is extended or adjusted under 35 U.S.C. 154(b) by 799 days.

(21) Appl. No.: 18/007,659

(22) PCT Filed: Jun. 2, 2021

(86) PCT No.: PCT/SE2021/050514  
§ 371 (c)(1),  
(2) Date: Dec. 1, 2022

(87) PCT Pub. No.: WO2021/246942  
PCT Pub. Date: Dec. 9, 2021

(65) Prior Publication Data  
US 2023/0263087 A1 Aug. 24, 2023

(30) Foreign Application Priority Data  
Jun. 4, 2020 (SE) .................................... 2050653-1

(51) Int. Cl.  
*A01C 3/00* (2006.01)  
*A01C 3/02* (2006.01)  
(Continued)

(52) U.S. Cl.  
CPC ............ *A01C 3/026* (2013.01); *B01F 23/511* (2022.01); *B01F 23/53* (2022.01); *B01F 23/565* (2022.01);  
(Continued)

(58) Field of Classification Search  
CPC .. A01C 3/026; B01F 2101/005; B01F 23/565; B01F 35/212; B01F 35/222  
See application file for complete search history.

(56) References Cited

U.S. PATENT DOCUMENTS

2013/0044562 A1* 2/2013 Selenius ................. C02F 11/04  
366/331  
2017/0118907 A1 5/2017 Nuhn et al.  
2017/0232411 A1* 8/2017 Smith ................. B01F 35/2131  
366/142

FOREIGN PATENT DOCUMENTS

EP          1 776 998          4/2007  
KR     10-2018-0003133      1/2018  
(Continued)

OTHER PUBLICATIONS

International Search Report dated Sep. 10, 2021, for PCT/SE2021/050514, 3 pp.  
(Continued)

*Primary Examiner* — Anshu Bhatia  
(74) *Attorney, Agent, or Firm* — NIXON & VANDERHYE

(57) ABSTRACT

A method for controlling operation of a manure arrangement (10) that includes a manure storage structure (3), an agitator (11), and an agitator motor (8) arranged to actuate the agitator (11). The method including monitoring (S1), while mixing manure in the manure storage structure (3) with the agitator (11), a load quantity indicative of a load on the agitator motor (8). The method further including controlling (S2) operation of the manure arrangement (10) based on the monitored load quantity. A manure arrangement (10) arranged to perform the method is provided.

16 Claims, 4 Drawing Sheets

(51) Int. Cl.

| | | |
|---|---|---|
| *B01F 23/50* | (2022.01) | |
| *B01F 23/53* | (2022.01) | |
| *B01F 35/212* | (2022.01) | |
| *B01F 35/221* | (2022.01) | |
| *B01F 35/222* | (2022.01) | |
| *B01F 101/00* | (2022.01) | |

(52) U.S. Cl.
CPC ........ *B01F 35/212* (2022.01); *B01F 35/2211* (2022.01); *B01F 35/222* (2022.01); *B01F 2101/005* (2022.01)

(56) References Cited

FOREIGN PATENT DOCUMENTS

| | | |
|---|---|---|
| WO | 01/84940 | 11/2001 |
| WO | 2016/073499 | 5/2016 |

OTHER PUBLICATIONS

Written Opinion of the ISA dated Sep. 10, 2021, for PCT/SE2021/050514, 5 pp.
Swedish Search Report dated Jan. 26, 2021, for SE Application No. 2050653-1, 2 pp.

* cited by examiner

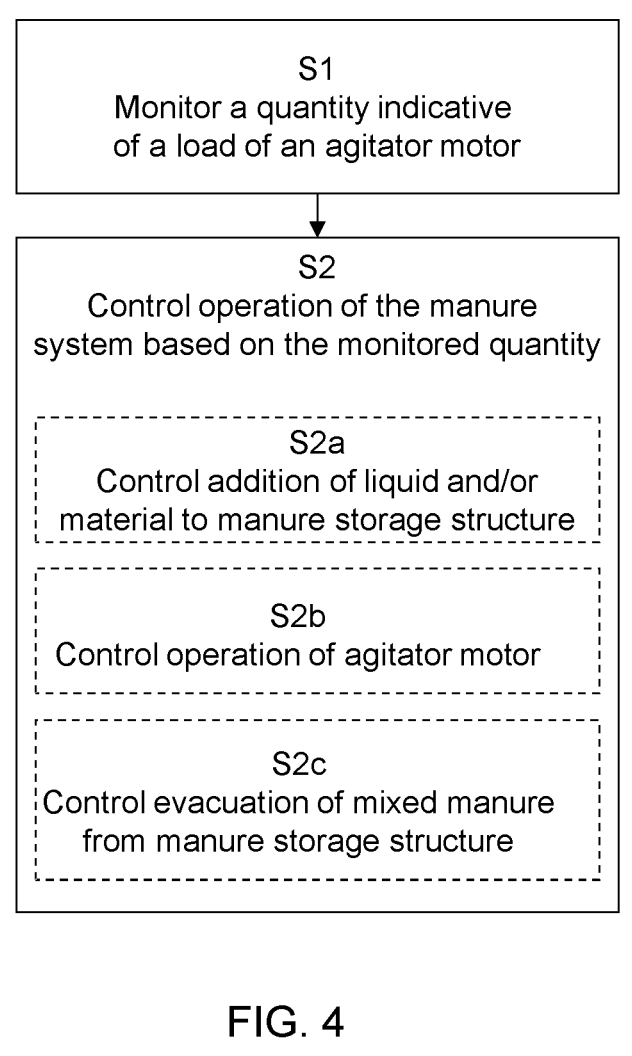

S1
Monitor a quantity indicative
of a load of an agitator motor

S2
Control operation of the manure
system based on the monitored quantity

S2a
Control addition of liquid and/or
material to manure storage structure

S2b
Control operation of agitator motor

S2c
Control evacuation of mixed manure
from manure storage structure

FIG. 4

MANURE ARRANGEMENT AND A METHOD FOR CONTROLLING OPERATION OF A MANURE ARRANGEMENT

This application is the U.S. national phase of International Application No. PCT/SE2021/050514 filed Jun. 2, 2021, which designated the U.S. and claims priority to SE 2050653-1 filed Jun. 4, 2020, the entire contents of each of which are hereby incorporated by reference.

TECHNICAL FIELD

The present disclosure relates to handling manure, in in particular to methods and systems for controlling operation of manure arrangements where the manure is agitated.

BACKGROUND

At farms, manure from livestock is collected and stored until it shall be further used. The manure is typically transferred to an intermediate storage where it is homogenized with an agitator before it is pumped to a final storage or fed to a manure separator. The distances for pumping are different depending on the farm layout, and it is therefore important to have manure density under control so the manure can be pumped efficiently. To obtain proper manure properties, water or liquid sewage often needs to be added manually.

In the storage, sedimentation of manure causes lack of slurry uniformity. Therefore, the manure needs to be mixed in order to provide a homogenous mixture that can be pumped efficiently. Present mixing solutions are based on hypothetical estimations, which can cause mixing to be too short or too long. Too short mixing may cause pump overload, pump choke, a variable manure flow while pumping, remaining sedimentation and issues with separation of the manure as the material of the manure is not homogenous. Too long mixing may cause quick wear of the equipment and also ineffective use of energy. Also, too high density of the manure may cause blockage of the agitator by foreign bodies, which can significantly decrease mixing efficiency and finally decrease pumping performance. All the described problems require farmer supervision.

SUMMARY

It is an object of the present disclosure to solve at least some of the problems with the prior known mixing solutions. It is a further object to provide a method for controlling operation of a manure arrangement that provides desired manure properties. It is a further object to provide a method for controlling operation of a manure arrangement that reduces wear of the equipment used. It is a further object to provide a method for controlling operation of a manure arrangement that reduces energy consumption.

These objects and others are at least partly achieved by the method and the manure arrangement according to the independent claims, and by the embodiments according to the dependent claims.

According to a first aspect, the disclosure relates to a method for controlling operation of a manure arrangement. The manure arrangement comprises a manure storage structure, an agitator and an agitator motor arranged to actuate the agitator. The method comprises monitoring, while mixing manure in the manure storage structure with the agitator, a load quantity indicative of a load on the agitator motor. The method further comprises controlling operation of the manure arrangement based on the monitored load quantity.

The load on the agitator motor reflects the density of the manure the agitator is mixing. By observing the size of the load and how it varies over time, properties of the manure arrangement such as mixing time, addition of water, liquid sewage or manure can be adapted to the situation at hand. Thereby, it is possible to provide a manure in the storage structure that has desired properties with reduced wear and saved energy.

According to some embodiments, the method comprises controlling operation based on variation among values of the monitored load quantity. The variation reflects properties of the manure, which may then be determined, such as degree of homogenization or change of density.

According to some embodiments, the controlling operation comprises controlling operation of the agitator motor based on the monitored quantity. Thus, properties of the agitator pump may be controlled based on the monitored quantity, such as speed, when to stop and/or when to start the agitator pump. Thereby, the mixing time may be optimized for the situation at hand. For example, if the load on the agitator motor has stabilized, there is no need for more mixing and the agitation can be stopped.

According to some embodiments, the controlling operation comprises controlling evacuation of the mixed manure from the manure storage structure based on the monitored quantity. Thus, by monitoring the load on the agitator motor, it is possible to determine when the manure has desired properties and is ready for being pumped, or by other means be evacuated from the manure storage structure.

According to some embodiments, the controlling operation of the agitator motor comprises stopping mixing upon the monitored quantity satisfying at least one of one or more mixture criteria, and/or wherein the controlling evacuation comprises starting evacuation of mixed manure from the manured storage upon the monitored quantity satisfying at least one of the one or more mixture criteria. Thus, the mixing can be stopped when the monitored load quantity indicates that the manure has a desired density and is homogenous. These indications may also be indicators to that the mixed manure is ready to be evacuated.

According to some embodiments, one of the one or more mixture criteria comprises that the monitored load quantity exhibits stability over a period of time. Thus, there is a low variance between values of the monitored load quantity. This is an indication to that the manure is homogenous.

According to some embodiments, one criterion of the one or more mixing criteria comprises that the monitored load quantity is within an interval of an average value of a set of values of the load quantity from previous mixing sessions, wherein the set of values represent values where the load quantity is exhibiting stability over a period of time in the previous mixing sessions. Thus, load quantity values from previous sessions may be taken into account. The method may then learn from previous sessions how to control the operation of the system to get mixed manure with desired properties to minimized amount of energy and wear.

According to some embodiments, the method comprises determining that the load quantity is exhibiting stability when a variation between values related to the monitored load quantities in the period of time is below a certain predetermined value. Then the load varies so little that the manure is considered to be homogenous.

According to some embodiments, wherein the values related to the monitored load quantities are average values of a plurality of monitored load quantity values. Thus, more values are taken into account which makes the determining more reliable.

According to some embodiments, the controlling operation comprises controlling addition of liquid and/or material to the manure storage structure based on the monitored quantity. Thus, liquid and/or material can be added to the manure in order to get desired properties of the manure.

According to some embodiments, the controlling comprises adding liquid to the manure storage structure upon the monitored quantity being above an upper load threshold, and/or adding material to the manure storage structure upon the monitored quantity being below a lower load threshold. Thereby, wear to the system can be reduced, and desired properties of the mixed manure be obtained.

According to a second aspect, the disclosure relates to a manure arrangement comprising: a manure storage structure, an agitator arranged to mix manure in the manure storage structure, an agitator motor arranged to actuate the agitator, a load sensor arranged to measure a load quantity indicative of a load on the agitator motor, and control circuitry comprising instructions to perform the method according to the first aspect, thus, any of the method steps as disclosed herein.

According to a third aspect, the disclosure relates to a computer program comprising instructions to cause the manure arrangement of the second aspect, to execute the steps of the method according to the first aspect, thus, any of the method steps as disclosed herein.

According to a fourth aspect, the disclosure relates to a computer-readable medium having stored thereon the computer program of the third aspect.

BRIEF DESCRIPTION OF THE DRAWINGS

FIG. 4 illustrates a flow chart of a method for controlling operation of a manure arrangement according to some embodiments of the disclosure.

DETAILED DESCRIPTION

In the following disclosure, a manure arrangement and methods for controlling operation of the manure arrangement will be described. The manure arrangement comprises a manure storage structure that is used for storage of manure. The manure delivered to the manure storage structure may comprise, besides animal feces and urine, livestock bedding, feeding leftover and/or other kinds of material. The delivered manure may have different texture from time to time, depending for example on what the animals have been eating and the time of year. Therefore, liquid such as water is often added to the manure in the manure storage structure to get a more fluid manure. An agitator that is driven by an agitator motor is arranged to mix the manure in the manure storage structure.

It is herein proposed to monitor a quantity indicative of the load on the agitator motor. The method relies on the insight that the load on the agitator motor is indicative of the density and the homogeneity of the manure. By analysis of the monitored quantities, the mixing time may be optimized whereby energy can be saved. Addition of liquid or material may also be optimized to a provide desired density of the manure, whereby for example water can be saved. The method can be made partly or fully automatic, which entails less supervision and operation involvement. Also, by being able to provide a mixed manure with a known density, a following separation process for nutrient elements calculation can be improved. Knowledge of the dry matter content of the manure, known from the density, may also be used to improve a final solid fraction after the separation process.

Figure 1:
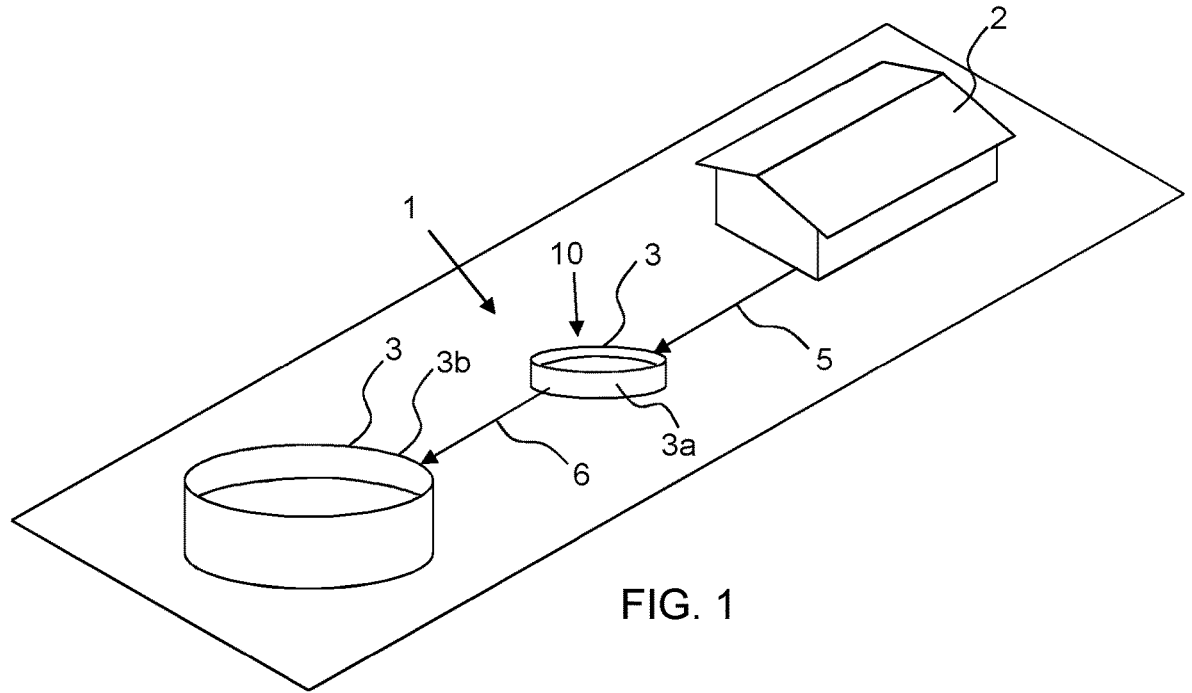
FIG. 1 illustrates an overview of a manure handling system of a farm.

FIG. 1 illustrates an overview of a farm comprising a barn 2 and a manure handling system 1. The herein disclosed manure arrangement and methods for controlling operation of the manure arrangement may be implemented and used in such manure handling system 1. However, the disclosed manure arrangement and methods may instead be implemented in other kinds of manure handling systems.

The barn encloses a livestock area. The barn 2 is for example a dairy barn. The barn may be a freestall barn where animals are free to walk around, or a tie stallbarn where the animals are tied up, or a combination thereof. The manure handling system 1 comprises a manure storage structure 3 embodied as a pit 3a, and another manure storage structure 3 embodied as a lagoon 3b. The pit 3a is typically a transfer storage of the manure handling system 1, where the manure is collected for a limited time such as 1-7 days. The manure is here treated such that it achieves desired properties. The manure is then transferred to the lagoon 3a. In the lagoon 3b the treated manure from the pit 3a is stored for longer times, such as several months. The lagoon 3b is typically larger in size than the pit 3a. The manure handling system 1 also comprises channels. i.e. pipes, for transporting the manure between the different entities. A first channel 5 is arranged between the barn 2 and the pit 3a. The first channel 5 fluidly connects the barn 2 and an interior of the pit 3a. Manure collected in the barn 2 can then be transported, e.g. by pumping, by using height difference and gravitation, or by scraping, to the interior of the pit 3a via the first channel 5. A second channel 6 is arranged between the pit 3a and the lagoon 3b. The second channel 6 fluidly connects the interior of the pit 3a and the interior of the lagoon 3b. Manure collected in the pit 3a can then be transported, e.g. by pumping, by height difference or by scraping, to the interior of the lagoon 3b via the second channel 6. A manure arrangement 10 is indicated in FIG. 1, where the manure arrangement 10 includes the manure storage structure 3 in the shape of a pit 3a.

Figure 2:
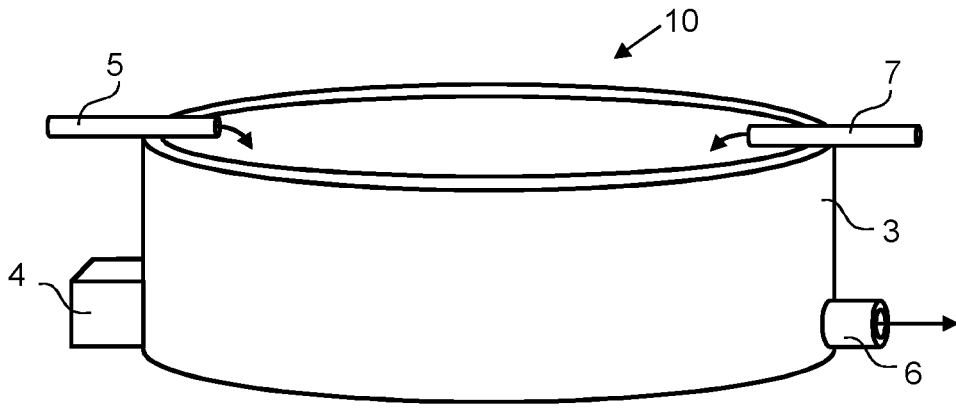
FIG. 2 illustrates a manure arrangement according to some embodiments of the disclosure.
Figure 3:
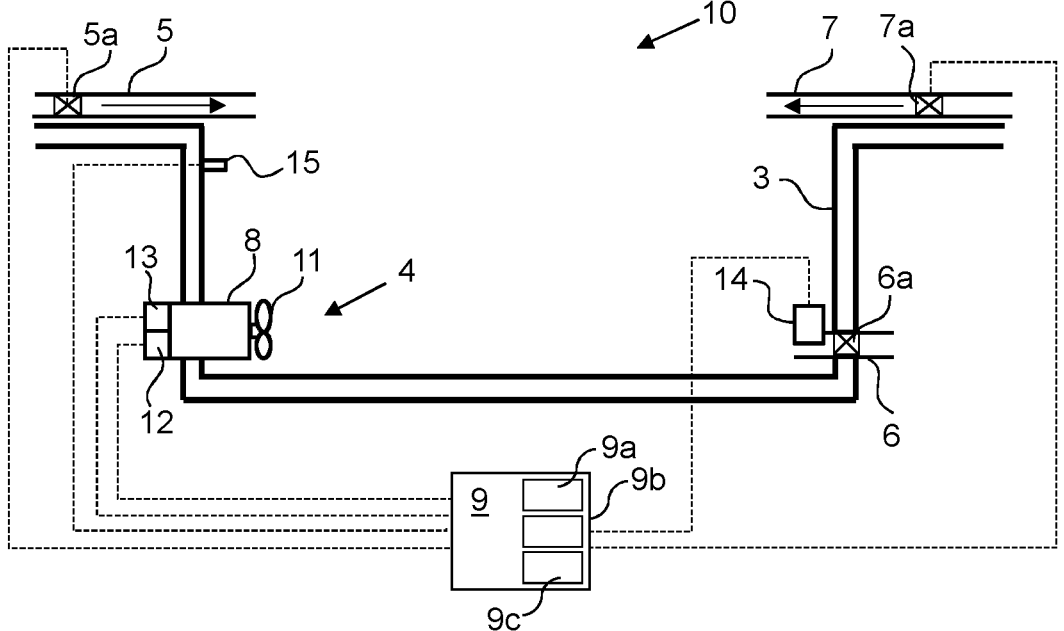
FIG. 3 illustrates a cross-section of the manure arrangement of FIG. 2.

FIG. 2 illustrates a manure arrangement 10 according to some embodiments of the disclosure, and FIG. 3 illustrates a cross-section of the same manure arrangement 10. The manure arrangement 10 includes the manure storage structure 3, that here is embodied as the pit 3a in FIG. 1. However, the manure storage structure 3 may instead be the lagoon 3b in FIG. 1, or any other lagoon, pit, pond, tank or building designed to store manure. The manure arrangement 10 further comprises an agitator arrangement 4 comprising an agitator motor 8 arranged to operate an agitator 11 (see FIG. 3). The first channel 5 is arranged to transport manure to the interior of the manure storage structure 3. The first channel is arranged to an uppermost edge of the manure storage structure 3, but in other embodiments the first channel 5 may be arranged to the manure storage structure 3 in alternative ways. The second channel 6 is arranged to a lower part of the manure storage structure 3. The second channel 6 is arranged to the manure storage structure 3, such that mixed manure can be transported out from the interior of the manure storage structure 3 via the second channel 6. A third channel 7 is arranged to pass liquid such as water and/or liquid sewage into the manure storage structure 3.

In FIG. 3 the agitator motor 8 and the agitator 11 of the agitator arrangement 4 can be seen. The agitator 8 is arranged to agitate, i.e. mix, the manure in the manure storage structure 3. In some embodiments, the agitator 11 comprises one or more impellers or paddles. The agitator 11 also comprises a shaft arranged between the one or more impellers or paddles, and the agitator motor 8. The agitator motor 8 operates the shaft to rotate the impellers or paddles. The power of the agitator motor 8 is for example up to 18 kW. The manure arrangement 10 further comprises a motor controller 13. The motor controller 13 is arranged to control the agitator motor 8 to a certain speed. The manure arrangement 10 further comprises a load sensor 12. The load sensor 12 is arranged to measure a load quantity indicative of a load on the agitator motor 8. The manure arrangement 10 also comprises a level sensor 15. The level sensor 15 is arranged to sense the level of manure inside the manure storage structure 10. However, in some embodiments there is no such level sensor present in the manure arrangement 10. The level may then be monitored by the operator.

As mentioned, the load sensor 12 is arranged to indirectly or directly monitor a load quantity of the agitator motor. The load quantity comprises at least one of; power consumption, energy consumption or current consumption of the agitator motor 8. Thus, the load sensor 12 is for example a power sensor that is configured to sense the power (kW) consumed by the agitator motor 8. The power sensor comprises for example a thermistor, a thermocouple or a diode detector. The load sensor 12 is alternatively an energy meter, that accumulates the power over time to calculate the total energy (kWh) consumed by the agitator motor 8. The load sensor 12 is still alternatively a current sensor, that measures the current consumed by the agitator motor 8. An example of such sensor is a Hall sensor. The load sensor 12 may alternatively include a voltage sensor, that measures the voltage over the agitator motor 8. The load sensor 12 is arranged to provide the monitored quantities to the control circuitry 9, for example sending the monitored quantities to the control circuitry 9. Alternatively, the control circuitry 9 collects the monitored quantities from the load sensor 12. The control circuitry 9 is for example configured to receive monitored load quantities from the load sensor 12 via the communication interface 9c.

The manure arrangement 10 also comprises an evacuation mechanism 14 for evacuating mixed manure from the manure storage structure 3. In some embodiments, the evacuation mechanism 14 comprises a pump. The pump is then arranged to pump mixed manure from the interior of the manure storage structure 3 into the second channel 6. In some embodiments, the evacuation mechanism 14 comprises an evacuation valve 6a arranged to selectively close and open the flow path inside the third channel 7. A valve is for example an on/off valve or a proportional valve.

In some embodiments, the agitator arrangement 4 comprises a combined agitator mechanism and evacuation mechanism. In these embodiments, the agitator arrangement 4 comprises the agitator motor 8 and the agitator 11 as previously described, and comprises an agitator nozzle instead of impeller or paddles and shaft. The power of the agitator motor 8 is in such embodiments for example up to 55 kW. The agitator arrangement 4 is then arranged to be set in different modes. In a first mode, the agitator arrangement 4 is arranged to agitate the manure in the manure storage structure 3. The manure is then circulated through the nozzle and thereby mixed. In a second mode, the agitator arrangement 4 is arranged to suck or pump the mixed manure from the manure storage structure 3 into the second channel 6. When including a combined agitator mechanism and evacuation mechanism, the agitator arrangement 4 will be arranged to the opening of the second channel 6 into the interior of the manure storage structure 3, such that the agitator arrangement 4 can operate its agitator 11 to pass manure into the second channel 6 when in the second mode.

A first control mechanism 5a is arranged to the first channel 5, for controlling addition of manure to the manure storage structure 10. In some embodiments, the first control mechanism 5a comprises a valve that is arranged to selectively close and open the flow path inside the first channel 5. In some embodiments, the first control mechanism 5a comprises a pump for pumping manure to the manure storage structure 3. A second control mechanism 7a is arranged to the third channel 7, for controlling addition of liquid such as water and/or liquid sewage into the manure storage structure 3. In some embodiments, the second control mechanism 7a comprises a valve that is arranged to selectively close and open the flow path inside the third channel 7. A valve is for example an on/off valve or a proportional valve.

The manure arrangement 10 also comprises control circuitry 9. The control circuitry 9 is arranged to automatically control and monitor operation of the manure arrangement 10, based on input from sensors etc. and/or operator input. The control circuitry 9 comprises a processor 9a, a memory 9b and a communication interface 9c. The processor 9a comprises one or more processing units, such as one or more Central Processing Units (CPUs). The memory 9b comprises one or more memory units. The memory 9b comprises one or more memory units. The communication interface 9c is configured for communication of signals and/or data to and from the control circuitry 9, to control and monitor operation of the manure arrangement 10. The communication interface 9c may also comprise a user interface (not shown). The user interface may be a remote user interface. The user interface may comprise an input device such as a touch screen, keyboard or microphone. The control circuitry 9 may also be at least partly be remotely distributed, e.g. to "a cloud server". Data may then be communicated via the communication interface to the cloud, or directly from sensors to the cloud. The data may then be processed in the cloud (cloud computing), and control data or signal sent back to the manure arrangement 10. Thus, the manure arrangement 10 may be controlled via control circuitry 9 such as a programmable logic controller (PLC), an edge computer, the cloud server, a Personal Computer (PC), a smart device, etc. The control circuitry 9 is arranged to send control signals to the different control mechanisms 5a, 7a, the motor control unit 13 and the evacuation mechanism 14, via its communication interface 9c in order to control their functions. The control circuitry 9 is also arranged to receive monitored, sensed or measured signals from the load sensor 12 and the level sensor 15, and in some embodiments also from the different control mechanisms 5a, 7a, the motor control unit 13 and the evacuation mechanism 14, via its communication interface 9c. In some embodiments, the control circuitry 9 is arranged to provide an indication to an operator, for example sound an alarm, in case the monitored load quantities exhibits an unexpected behavior. For example, if the load exceeds a maximum load threshold, that is greater than the upper load threshold, an indication is provided. The indication may be transmitted to the operator as sound, tactile means, light, electronic message etc., via the user interface. The indication may alternatively be transmitted to a smart device such as a mobile phone of the user.

According to some embodiments, the control circuitry 9 stores a computer program in the memory 9b comprising instructions which, when the program is executed by the processor 9a, cause a manure arrangement to carry out a method as illustrated in FIG. 4 for operating a manure arrangement. The manure arrangement is for example any one of the manure arrangements as explained herein.

In the following the method for operating the manure arrangement will be explained with reference to the flow chart in FIG. 4, and to the diagrams in FIGS. 5 and 6. The method is performed when manure has been added to the manure storage structure 3, for example via the first channel 5. Alternatively, manure has been added to the manure storage structure 3 from a tank of a truck, or by means of a tractor transporting manure in a bucket to the manure storage structure 3. The manure should now be treated to get desired properties of the manure. In some embodiments, the method is initiated when the control circuitry 9 receives an indication from the level sensor 15 that the manure in the manure storage structure 3 has reached a certain predetermined level. In another embodiments, an operator gives an input via the user interface of the control circuitry 9 that it is now time to start mixing. Upon detecting any such indication, the control circuitry 9 sends a control signal to the motor controller 13 of the agitator motor to start mixing. Upon receiving the control signal, the motor controller 13 controls the agitator motor 8 to a certain speed and the agitator 11 starts mixing the manure. Information of the certain speed may be included in the control signal or preprogrammed in the motor controller 13. The method comprises monitoring S1 a load quantity indicative of a load on the agitator motor 8 while mixing manure in the manure storage structure 3 with the agitator 11. The monitoring S1 includes for example sensing or measuring values of the load quantity with a load sensor, for example any of the load sensors 12 described above (FIG. 3). The method includes providing the sensed or measured load quantity values to the control circuitry 9. In some embodiments, the method includes providing the load quantity values continuously, continually, repeatedly or at certain intervals to the control circuitry 9. The load quantity indicates a momentary load on the agitator motor 8. The momentary load on the agitator motor 8 depends on the degree of homogeneity, i.e. uniformity, of the mixed manure. The momentary load on the agitator motor also depends on the density of the manure. There is thus a relation between the momentary load and the degree of homogeneity and density of the manure. A variation of the momentary load indicates a degree of homogeneity of the manure. The degree of variation also indicates a degree of change of density of the manure. The load in itself indicates the actual density of the manure. An increased load indicates an increased density of the manure. A decreased load indicates a decreased density of the manure. Thus, by evaluating the monitored quantity, information about current properties such as homogeneity and density of the manure can be obtained. The method further comprises controlling S2 operation of the manure arrangement 10 based on the monitored load quantity. For example, the operation of the manure arrangement can be controlled such that the manure gets desired properties based on the information of current properties of the manure. In some embodiments, liquid is added to decrease the density of the manure. The operation of the manure arrangement may also be controlled to stop mixing and/or to start evacuating manure when the current properties are satisfying. Thus, controlling operation of the manure arrangement 10 includes controlling operation of one or more of the first control mechanism 5a, the second control mechanism 7a, the agitator motor 8, and the evacuation mechanism 14. The controlling S2 operation typically includes to analyze a trend or development of the load quantity retrieved during mixing from one manure mixing session. A manure mixing session includes a time period from a time point where the mixing is initiated to a time point where the mixing can be stopped, and the manure is ready for being evacuated. In some embodiments, the controlling S2 operation includes to analyze a trend or development of the load quantity for a plurality of manure mixing session, thus including one or more previous mixing sessions. The method may thus include analyzing variation between the monitored load quantity values retrieved from the same mixing session, and/or retrieved from one or more previous mixing sessions. Thus, in some embodiments, the method comprises controlling operation S2 based on variation among values of the monitored load quantity.

In the following it will be described in conjunction with the graphs in FIGS. 5 and 6 how the monitored quantities can be evaluated, and the result of the evaluation used for controlling operation of the manure arrangement. FIG. 5 is a graph where one axis depicts the load "L" on the agitator motor, and the other axis depicts the time "t" in seconds "s". The load L during a mixing session is illustrated as a curve A. As can be seen in the graph, the load L starts increasing while mixing and increases above an upper load threshold L1 at time point t1. An increased load means that the density of the manure is increasing. This situation may for example occur if the manure comprises a lot of dry pieces and the manure becomes generally more dense as the mixing continues. As mentioned, the load L depends on the density of the mixed manure. If the density is high, the load will also be high as it takes a lot of power for the agitator to maintain its speed to mix the dense manure. The upper load threshold L1 indicates a load related to a maximum allowed density of the manure. Thus, at this load threshold L1, the density is so large that further mixing may cause harm to the agitator. If the load L goes above the upper load threshold L1, more liquid needs to be added to the manure in the manure storage structure 3 to make it less dense and more liquid. Thus, in some embodiments, the method comprises adding liquid to the manure storage structure 3 upon the monitored quantity being above an upper load threshold. The liquid may be added as a predetermined amount, or continuously until the load quantity is again below or on the upper load threshold. The liquid is added by controlling the third control mechanism 7a to add liquid such as water and/or liquid sewage to the manure storage structure 3. For example, upon the monitored quantity goes above the upper load threshold, the control circuitry 9 is sending a control signal to the third control mechanism 7a to open a valve and thereby add liquid. Thus, liquid is added to the manure storage structure, and the curve A goes below the upper load threshold L1 at time point t2 as the density is decreased and the manure is easier to mix, whereby the load on the agitator motor 8 is reduced.

Figure 5:
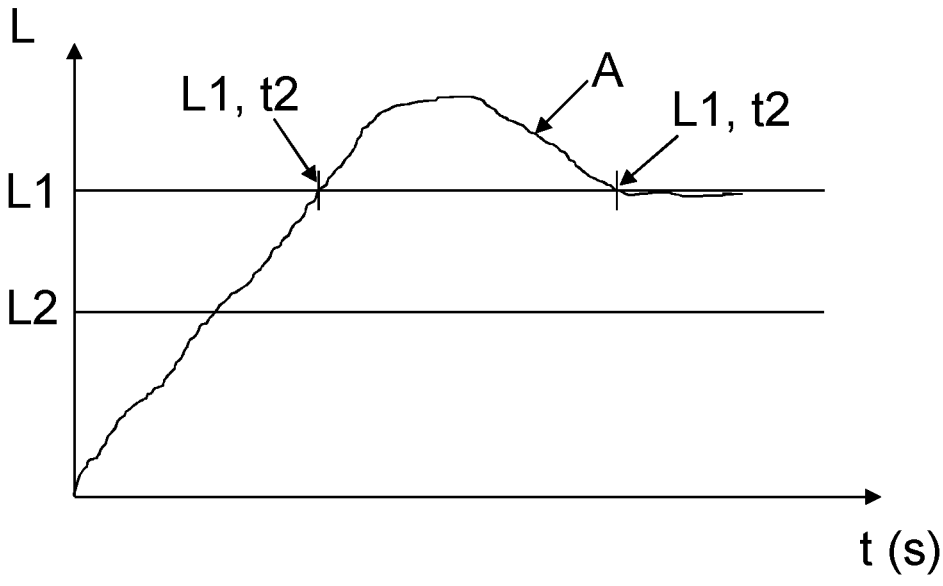
FIGS. 5-6 are graphs illustrating different mixing scenarios.

In another scenario not illustrated, the curve A is going down at the beginning because the load L decreases, instead of going up as illustrated in FIG. 5. A decreased load means that the density of the manure is decreasing. This is a typical initial behavior of the manure when starting mixing, and may for example occur if the manure has sedimented and generally becomes less dense as the mixing continues. It is expected that the load will soon stop decreasing and start stabilizing. However, sometimes the manure is too liquid, and the load will continue to decrease. A lower load threshold L2 indicates a load related to a minimum allowed density of the manure. If the load L goes below the lower load threshold L2, more material needs to be added to the manure in the manure storage structure 3. Thus, in some embodiments, the method comprises adding material to the manure storage structure 3 upon the monitored quantity being below a lower load threshold. The material is for example more manure, for example manure that has a higher density or is more dry than the manure already in the manure storage structure 3. The material may be added as a predetermined amount, or continuously until the load quantity is above or on the lower load threshold L2. The material is for example added by controlling the first control mechanism 5*a* to add manure to the manure storage structure 3. For example, upon the monitored quantity going below the lower load threshold L2, the control circuitry 9 sends a control signal to the first control mechanism 5*a* to add manure. Thus, in some embodiments, the method comprises controlling S2*a* addition of liquid and/or material to the manure storage structure 3 based on the monitored quantity. The upper load threshold L1 and the lower load threshold L2 delimits a desired interval of the load on the agitator motor 8, that thus indicates or reflects a desired interval of the density of the mixed manure. Thus, generally it is monitored and controlled that the load is within the upper load threshold and the lower load threshold.

While mixing the manure, the manure will become more and more homogenous. As mentioned, the momentary load on the agitator motor 8 depends on the degree of homogeneity of mixed manure. At some point of mixing, the manure will reach a level of maximum feasible homogeneity and longer mixing will bring very little or no further change to the homogeneity. At such time, the agitator motor 8 can be stopped. Thus, in some embodiments, the controlling operation S2 comprises controlling S2*b* operation of the agitator motor 8 based on the monitored quantity. The mixed manure is then also ready to be evacuated. Thus, in some embodiments, the controlling operation S2 comprises controlling S2*c* evacuation of the mixed manure from the manure storage structure 3 based on the monitored quantity. In some embodiments, the controlling S2*b* operation of the agitator motor 12 comprises stopping mixing upon the monitored quantity satisfying at least one of one or more mixture criteria. The method may also include controlling speed of the agitator motor 12, for example to different speeds. In some embodiments, the controlling S2*c* evacuation comprises starting evacuation of mixed manure from the manured storage 3 upon the monitored quantity satisfying at least one of the one or more mixture criteria. The method may also include controlling speed of evacuation of the manure, for example to different speeds.

A mixture criterion is for example that the monitored load quantity exhibits stability over a period of time. Then, a maximum feasible homogeneity has been achieved. In some embodiments, the method comprises determining that the load quantity is exhibiting stability when a variation between values related to the monitored load quantities in the period of time is below a certain predetermined value. Then, the load varies so little that the manure is considered to be homogenous. The values related to the monitored quantities are for example measured values of the monitored load quantity, or average values of a plurality of monitored load quantity values. In other words, stability can be determined when the monitored load quantities, or therefrom derived quantities such as average values thereof, differ from each other less than a predetermined value or threshold. For example, upon the differences between individual consecutive values of monitored load quantities or individual consecutive average values, within a period of time, are smaller than a predetermined value, the method comprises determining that the monitored load quantity exhibits stability over that period of time. The period of time encompasses for example two, three, four or more individual consecutive values. The period of time is for example 15 seconds to 2 minutes, for example 15, 30, 45, 60, 75, 90, 105 or 120 seconds. The period of time is typically a time window such as a sliding window.

Figure 6:
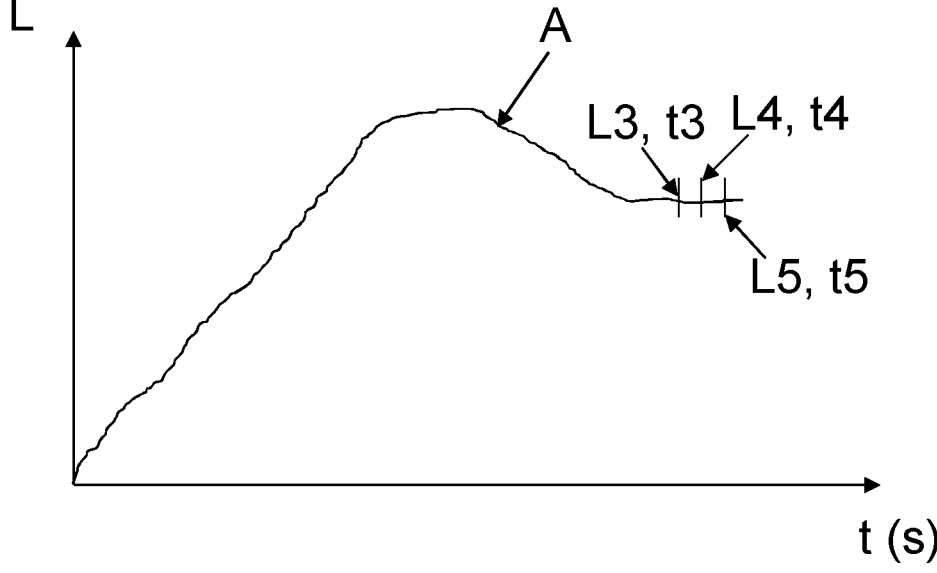

FIG. 6 is a graph where one axis depicts the load "L" on the agitator motor, and the other axis depicts the time "t" in seconds "s". The graph illustrates the same curve A as in FIG. 5. Between load L3 at time point t3, load L4 at time point t4 and the load L5 at time point t5, the load is considered to be stable, so at the time point t5 the agitator motor 8 can be stopped. In some embodiments, the method comprises calculating an average of the monitored load quantities at certain time points, e.g. at every 30-60 seconds. These average values can then be used instead of the individual monitored load quantities for determining if the monitored load quantity exhibits stability. In one embodiment, upon the load curve, thus the monitored quantities or average values, over a period of time is within a certain distance to a common load threshold value, the method comprises determining that the monitored load quantity exhibits stability over that period of time. The curve is then moving towards the common load threshold value. The variation between the values is then smaller than a certain predetermined value. In another embodiment, upon the derivative of the load curve is smaller than a certain derivative threshold value during the period of time, the method comprises determining that the monitored load quantity exhibits stability over that period of time.

In some embodiments, the method comprises using monitored load quantity values from previous mixing sessions. The mixing sessions may be performed during the same day, or during previous days. In some embodiments, the mixing sessions exhibit similar circumstances, such as same starting time of the day, same season, same month, and/or same amount of manure, etc. For each such mixing session, some values, or average values, can be determined where the load quantity is exhibiting stability over a period of time. These values, or average values, from one or more mixing sessions, together makes up a set of values. From the set of values, a representative average value is determined. This representative average value can then be a benchmark value for coming mixing sessions with similar circumstances. Thus, in some embodiments, the method comprises determining such representative average value, and determining that the monitored load quantity is exhibiting stability when one or more values of the monitored load quantity is with an interval of the representative average value. Thus, in some embodiments, the one criterion of the one or more mixing criteria comprises that the monitored load quantity is within an interval of an (representative) average value of a set of values of the load quantity from previous mixing sessions. The set of values represent values where the load quantity is exhibiting stability over a period of time in the previous mixing sessions.

In the following, an example of controlling operation of a manure arrangement will be explained. The manure arrangement is for example the manure arrangement as previously explained. Manure has been added to the manure storage structure 3, and the control circuitry 9 detects via the level sensor 15 that it is time for mixing. The control circuitry 9 starts the agitator motor 8 and the agitator 11 starts mixing the manure. The load on the agitator motor 8 is monitored. The load on the agitator motor 8 is first high, but then drops rapidly. This rapid drop indicates significant changes of the manure structure. After a while a time period of relative stabilization of the load starts. The manure is now mixed to an achievable level of uniformity, and the load quantity is exhibiting stability over a period of time. Longer mixing would not change the properties of the manure mixture to any greater extent. To determine when the load quantity is exhibiting stability over the period of time, in this example, average i.e. mean values of the load quantities are calculated repeatedly, for example every 30 second or 60 second of time. For example, after seconds, a first average value is calculated based on the load quantity values measured during these 30 seconds. A second average value is calculated based on the load quantity values measured during the next 30 seconds. A third average vale is calculated based on the load quantity values measured during the thereafter coming 30 seconds and so on. A load window or difference is defined as the greatest allowed absolute difference between two consecutive average load values. The condition that the absolute difference is less than the window, that is within the window, shall be true for at least two differences, thus using three consecutive average load values. Thus, if the difference between the third average load value and the second average load value is greater or equal to the load window, then the mixing is continued. If the difference however is less than the load window, then the difference between the second average load value and the first average load value is also checked. If this difference is less than the load window, then the mixing is stopped. Otherwise, the mixing is continued. The conditions are checked for each average, thus here every 30 seconds, and are continued until the conditions are fulfilled and the mixing can stop. After a while of monitoring load quantities, such condition exists and the control circuitry 9 is sending a control signal to the motor controller 13 to stop mixing. The motor controller 13 stops the agitator motor 8. The manure is now ready to be evacuated, and the control circuitry 9 sends a control signal to the evacuation mechanism 14 to start evacuating the mixed manure. In this case the evacuation mechanism 14 comprises a pump and the pump starts pumping manure out from the manure storage structure 3 into the second channel 6, and if provided, opens the evacuation vale 6a. The manure is now pumped out from the manure storage structure 3 until empty. The level sensor 15 is here arranged to sense when the manure storage structure 3 is considered empty. The control circuitry 9 receives an indication from the level sensor 15 that the manure storage structure 3 is empty, and thereby sends a control signal to the evacuation mechanism 14 to stop pumping. Alternatively, the evacuation mechanism 14 automatically detects that there is no more manure to pump and stops pumping by itself.

The present disclosure is not limited to the above-described preferred embodiments. Various alternatives, modifications and equivalents may be used. Therefore, the above embodiments should not be taken as limiting the scope of the disclosure, which is defined by the appending claims.

The invention claimed is:

1. A method for controlling operation of a manure arrangement comprising a manure storage structure, an agitator and an agitator motor arranged to actuate the agitator, the method comprising:

monitoring while mixing manure in the manure storage structure with the agitator, a load quality indicative of a load on the agitator motor;

controlling operation of the manure arrangement based on the monitored load quantity, and controlling evacuation of the mixed manure from the manure storage structure based on the monitored load quantity, wherein controlling the evacuation further comprises automatically starting evacuation of mixed manure from the manure storage structure in response to determining that the monitored load quantity satisfying at least one or more mixture criteria.

2. The method according to claim 1, further comprising controlling the operation of the manure arrangement based on a variation among values of the monitored load quantity.

3. The method according to claim 2, wherein controlling the operation of the manure arrangement comprises:

controlling operation of the agitator motor based on the monitored quantity.

4. The method according to claim 1, wherein controlling the operation of the manure arrangement comprises:

Controlling operation of the agitator motor based on the monitored load quantity.

5. The method according to claim 4, wherein controlling the operation of the agitator motor comprises:

stopping mixing upon the monitored quantity satisfying at least one of the one or more mixture criteria.

6. The method according to claim 5, wherein the one of the one or more mixture criteria comprises the monitored load quantity exhibiting stability over a period of time.

7. The method according to claim 5, wherein one criterion of the one or more mixing criteria comprises the monitored load quantity being within an interval of an average value of a set of values of the load quantity from previous mixing sessions, and wherein the set of values represent values where the load quantity is exhibiting stability over a period of time in the previous mixing sessions.

8. The method according to claim 6, further comprising determining that the load quantity is exhibiting stability when a variation between values related to the monitored load quantities in the period of time is below a certain predetermined value.

9. The method according to claim 8, wherein the values related to the monitored load quantities are average values of a plurality of monitored load quantity values.

10. The method according to claim 1, wherein controlling the operation of the manure arrangement comprises:

controlling addition of liquid and/or material to the manure storage structure based on the monitored load quantity.

11. The method according to claim 10, wherein the controlling the addition of liquid and/or manure storage structure comprises:

adding the liquid to the manure storage structure upon the monitored load quantity being above an upper load threshold, and/or adding the material to the manure storage structure upon the monitored load quantity being below a lower load threshold.

12. The method according to claim 1, wherein controlling the operation of the manure arrangement comprises:

controlling operation of the agitator motor, based on the monitored quantity, by stopping mixing upon the monitored quantity satisfying at least one of one or more mixture criteria, and controlling evacuation of mixed manure from the manure storage structure, based on the monitored quantity, by starting evacuation of mixed manure from the manured storage upon the monitored quantity satisfying at least one of the one or more mixture criteria.

13. The method according to claim 1, wherein the load quantity indicative of a load on the agitator motor is indicative of density and homogeneity of the manure.

14. The method according to claim 13, wherein controlling the operation of the manure arrangement comprises automatically controlling addition of liquid and/or material to the manure storage structure, based on the monitored load quantity, to provide a desired density of the manure.

15. A manure arrangement comprising:

a manure storage structure, an agitator arranged to mix manure in the manure storage structure, an agitator motor arranged to actuate the agitator, a load sensor arranged to measure a load quantity indicative of a load on the agitator motor, and a control circuitry configured to evacuate mixed manure from the manure storage structure based on a monitored load quantity, wherein controller circuitry is further configured to automatically start evacuation of mixed manure from the manure storage structure in response to determine that the monitored load quantity satisfying at least one or more mixture criteria.

16. A non-transitory computer-readable medium having stored thereon a computer program comprising instructions that, when executed, cause control circuitry of a manure arrangement comprising a manure storage structure, an agitator arranged to mix manure in the manure storage structure, an agitator motor arranged to actuate the agitator, and a load sensor arranged to measure a load quantity indicative of a load on the agitator motor, to perform the method according to claim 1.

\* \* \* \* \*